(12) United States Patent
Gossner et al.

(10) Patent No.: US 10,021,652 B2
(45) Date of Patent: Jul. 10, 2018

(54) REMOTE ANTENNA COMPENSATION (71) Applicant: NXP B.V.

(72) Inventors: Kai Peter Ludwig Gossner, Neukirchen-Vluyn (DE); Pieter Lok, Leur (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/816,945

(22) Filed: Nov. 17, 2017

(65) Prior Publication Data
US 2018/0152898 A1 May 31, 2018

(30) Foreign Application Priority Data
Nov. 30, 2016 (EP) ..................... 16201566

(51) Int. Cl.
H04B 7/00 (2006.01)
H04W 52/18 (2009.01)
H04W 16/28 (2009.01)
H04B 3/08 (2006.01)
H04W 16/26 (2009.01)

(52) U.S. Cl.
CPC ............. *H04W 52/18* (2013.01); *H04B 3/08* (2013.01); *H04W 16/26* (2013.01); *H04W 16/28* (2013.01)

(58) Field of Classification Search
CPC ..... H04W 52/18; H04W 16/26; H04W 16/28; H04B 3/08
See application file for complete search history.

(56) References Cited

U.S. PATENT DOCUMENTS

| 6,681,100 | B1* | 1/2004 | Ge ........................ H03G 3/3042 455/115.1 |
| 8,063,838 | B1* | 11/2011 | Tonn ........................ H01Q 1/34 343/709 |
| 9,191,903 | B2 | 11/2015 | Sasson |
| 2003/0134601 | A1 | 7/2003 | Jou |
| 2005/0250541 | A1 | 11/2005 | Bird et al. |
| 2006/0063494 | A1 | 3/2006 | Zhang et al. |
| 2006/0195161 | A1* | 8/2006 | Li ........................ A61N 1/37223 607/60 |
| 2007/0149145 | A1* | 6/2007 | Chang .................. H04B 1/0458 455/78 |

(Continued)

FOREIGN PATENT DOCUMENTS

EP 1 995 882 A1 11/2008
EP 2 983 298 A1 10/2016

*Primary Examiner* — Dominic Rego
(74) *Attorney, Agent, or Firm* — Rajeev Madnawat (57) ABSTRACT A remote antenna system is provided. The remote antenna system comprises an antenna controller circuit and a remote antenna circuit coupled to the antenna controller circuit by a cable. The remote antenna system further comprises a bidirectional data signal path for carrying transmit and received data signals between the antenna controller circuit and the remote antenna circuit; and a control path for carrying control information between the antenna controller circuit and the remote antenna circuit. The control path is a bidirectional control path. The control path comprises a transmit circuit comprising an input to receive control information and configured to convert the control information into a series of pulses; and a receive circuit comprising a comparator circuit configure to receive the series of pulses and reconstruct them to the control signal.

15 Claims, 5 Drawing Sheets (56) References Cited

U.S. PATENT DOCUMENTS

| | | | |
|---|---|---|---|
| 2008/0175212 A1* | 7/2008 | Angell | H04W 88/085 |
| | | | 370/338 |
| 2009/0245425 A1 | 10/2009 | Tsutsui et al. | |
| 2010/0184385 A1* | 7/2010 | Lin | H04N 7/20 |
| | | | 455/73 |
| 2011/0009105 A1* | 1/2011 | Lee | H01Q 9/0407 |
| | | | 455/418 |
| 2014/0148214 A1 | 5/2014 | Sasson | |
| 2014/0163316 A1* | 6/2014 | Koide | A61B 1/00016 |
| | | | 600/103 |
| 2015/0124662 A1* | 5/2015 | Babitch | H04L 5/1461 |
| | | | 370/278 |
| 2015/0195882 A1* | 7/2015 | Chu | H05B 33/0842 |
| | | | 315/185 R |
| 2016/0019766 A1* | 1/2016 | Padula | G08B 13/2477 |
| | | | 340/572.1 |
| 2016/0044601 A1 | 2/2016 | Dykyy | |
| 2016/0294450 A1* | 10/2016 | Treatch | H04B 5/0018 |
| 2017/0250860 A1* | 8/2017 | Kim | H04L 41/0843 |

\* cited by examiner

REMOTE ANTENNA COMPENSATION

CROSS-REFERENCE TO RELATED APPLICATIONS

This application claims the priority under 35 U.S.C. § 119 of European Patent application no. 16201566.3, filed on Nov. 30, 2016, the contents of which are incorporated by reference herein.

FIELD

This application relates to the compensating for cable loss when providing a signal to a remote antenna.

BACKGROUND

In systems such vehicle to vehicle (V2V) or vehicle to everything (V2X), vehicles may be equipped with antennas and transceiver units for communicating with other vehicles or entities such as road side entities. Because of the shape of a vehicle and various mounting restrictions, it may be difficult to mount an antenna on the vehicle such that it has an omnidirectional coverage of the area surrounding the vehicle. For example, one potential mounting position for an antenna on the vehicle is a side mirror. While this may satisfy certain mounting criteria, the vehicle body may block the coverage area of the antenna with the vehicle body acting as a reflector. In this case, the antenna only covers an area adjacent to the side of the vehicle on which the antenna is mounted.

The coverage area may be increased by providing a second, remote antenna. When a single antenna is used, the transceiver and antenna may be co-located, however with a remote antenna, at least some cable must be introduced to connect the remote antenna to the transceiver. Ideally, the connection or cable length between the remote antenna and the transceiver would be minimised but there is a trade-off between cable length and a position of the remote antenna providing broader coverage for the system. Following from the above example, the antenna and transceiver may be mounted on a first side mirror of the vehicle with a remote antenna mounted on the other side mirror of the vehicle. This may provide the system with antenna coverage on both sides of the vehicle, however a cable coupling the remote antenna to the transceiver would have to be at least the width of the vehicle.

The cable may cause a loss of signal power between the transceiver and remote antenna, for example as large as 10 dB. This may greatly reduce the range of the remote antenna. The transceiver itself may not have the amplifying capabilities to amplify a signal on the cable to compensate for this cable loss. This may be addressed by introducing circuitry at the remote antenna to provide amplification to attempt to compensate for the cable loss. However even the addition of such amplification at the remote antenna is not ideal. The present application aims to at least partially address and compensate for cable loss.

SUMMARY

According to a first aspect of the present application, there is provided a remote antenna system comprising: an antenna controller circuit; and a remote antenna circuit coupled to the antenna controller circuit by a cable; the remote antenna system comprising: a bidirectional data signal path for carrying transmit and received data signals between the antenna controller circuit and the remote antenna circuit; and a control path for carrying control information between the antenna controller circuit and the remote antenna circuit; wherein the control path is a bidirectional control path comprising: a transmit circuit comprising an input to receive control information and configured to convert the control information into a series of pulses; and a receive circuit comprising: a comparator circuit configure to receive the series of pulses and reconstruct them to the control signal.

The transmit circuit may comprise a high pass filter configured to receive a control information signal and convert a transition of the control information signal to a pulse. The control information signal may comprise a square wave and a transition of the control information signal comprises one of a high to low transition and a low to high transition. The high pass filter may comprise a resistor and capacitor coupled in series between a control information signal input and cable circuitry. The control path may operate in a first direction from the remote antenna controller circuit to the remote antenna circuit and the control information carried in the first direction comprises a transmit state signal indicating whether the remote antenna is to transmit the data signal or receive the data signal. The control path may operate in a second direction from the remote antenna circuit to the remote antenna controller circuit and the control information carried in the second direction comprises a measured power signal corresponding to a transmit power of the remote antenna.

The comparator circuit may comprise an output for outputting the reconstructed signal. The remote antenna circuit may further comprise a compensation circuit configured to amplify the data signal to compensate for cable loss of the cable. The compensation circuit may comprise a first amplifier to amplify a transmit data signal and a second amplifier to amplify a receive data signal and first and second switches to switch between the first and second amplifiers in response to the transmit state signal. The comparator circuit may be configured to receive a series of pulses from the remote antenna controller and reconstruct the series of pulses to a transmit state signal.

The remote antenna system may further comprise a microcontroller configured to measure a power at the first amplifier and generate a measured power signal to be carried by the control path in the first direction. The microcontroller may be further configured to generate a hold signal to be coupled to the comparator, the hold signal overrides the output of the comparator circuit such that it corresponds to the hold signal. The microcontroller may be configured to generate the hold signal to set the comparator circuit output to a transmit state of the antenna being transmitting in response to generating a measured power signal.

According to a second aspect, there is provided a remote antenna circuit configured to be coupled to an antenna controller by a cable; the remote antenna circuit comprising: a bidirectional data signal path for carrying transmit and received data signals between the antenna controller circuit and the remote antenna circuit; and control path for carrying control information between the antenna controller circuit and the remote antenna circuit; wherein the control path is a bidirectional control path comprising: a transmit circuit comprising an input to receive control information and configured to convert the control information into a series of pulses; and a receive circuit comprising: a comparator circuit configure to receive the series of pulses and reconstruct them to the control signal.

According to a third aspect, there is provided a remote antenna controller configured to be coupled to a remote antenna circuit by a cable; the remote antenna controller comprising: a bidirectional data signal path for carrying transmit and received data signals between the antenna controller and the remote antenna circuit; and a control path for carrying control information between the remote antenna controller and the remote antenna circuit; wherein the control path is a bidirectional control path comprising: a transmit circuit comprising an input to receive control information and configured to convert the control information into a series of pulses; and a receive circuit comprising: a comparator circuit configure to receive the series of pulses and reconstruct them to the control signal.

FIGURES

Embodiments will be described, by way of example only, with reference to the drawings, in which.

It will be appreciated that for features that span more than one drawing like reference numerals indicate the like feature.

DETAILED DESCRIPTION

Figure 1:
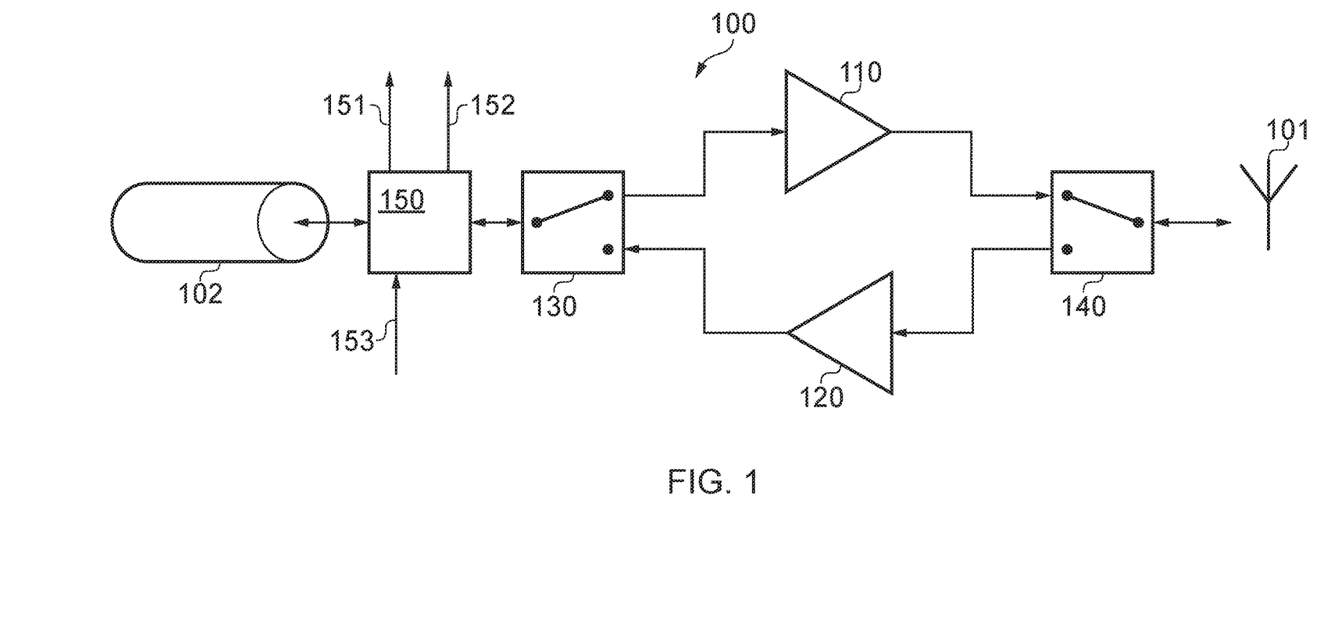
FIG. 1 is an example of a compensation circuit for a remote antenna.

FIG. 1 shows an example of a cable loss compensator circuit 100 that may be implemented in a system comprising a primary antenna and transceiver (not shown) and a remote antenna 101. The cable loss compensator circuit 100 may be co-located with the remote antenna 101 and may be coupled to the transceiver via a cable 102. The compensator circuit 100 may be configured to compensate signals at the remote antenna side for cable loss.

The cable 102 may be a bidirectional cable configured to carry signals between a primary antenna or controller side and a remote antenna side of a transceiver system, for example a V2X system. The cable 102 may be coupled to the compensator circuit 100 on the remote antenna side and a transceiver on the controller side.

The compensator circuit 100 may comprise a first amplifier 110 and a second amplifier 120 coupled in parallel between a first switch 130 and a second switch 140. The first switch 130 may be coupled to an input of the first amplifier 110 and an output of the second amplifier 120. An output of the first amplifier 110 and an input of the second amplifier 120 may be coupled to the second switch 140. The second switch 140 may be bi-directionally coupled to the remote antenna 101. The first switch 130 may be bi-directionally coupled to the cable 102 via a signal separator 150.

The first switch 130, first amplifier 110, second amplifier 120 and second switch 140 are arranged to form transmit and receive compensation paths for the transceiver system. When the transceiver system is transmitting, the first 130 and second 140 switch are arranged to form a transmit path for the remote antenna 101. The first switch 130 is configured to couple a transmit signal received on its bidirectional coupling to the input of the first amplifier 110 and the second switch 140 is configured to couple the output of the first amplifier 110 to the remote antenna. The first amplifier 110 may be a power amplifier and may be configured to amplify the transmit signal received at the compensator circuit 100 to compensate for cable loss.

When the transceiver system is receiving, the first 130 and second 140 switch are arranged to form a receive path for a receive signal received by the remote antenna 101. The second switch 140 is configure to couple the remote antenna 101 to the second amplifier 120. The first switch 130 is configured to couple the output of the second amplifier 120 to the cable 102 via the signal separator 150. The second amplifier 120 may be a low noise amplifier (LNA) and may be configured to amplifier the receive signal to compensate for loss that that signal may experience over the cable 120.

The compensator circuit may arrange the first switch 130, first amplifier 110, second amplifier 120 and second switch 140 to form either a transmit or receive compensation path in response to an indication that the remote antenna is to transmit a data signal or receive a data signal. The indication may be provided as a control signal provided over the cable. The control signal may indicate whether the transceiver is transmitting or receiving and the switches may be arranged in response to this signal. Power may also be provided to the compensator circuit 100. The power may be provided as a power signal over the cable. Thus, in addition to the transmit or receive signal, the cable may further carry a control and a power signal. These signals may form a combined signal at the remote antenna 101 end of the cable 102. The signal separator 150 may be provided to separate these signals into a power signal 151, a control signal 150 and the transmit or receive signal. The transmit or receive signal connection of the signal separator may be coupled to the first switch 130.

While the amplification of transmit signals by the first amplifier 110 and amplification of receive signals by the second amplifier 120 may compensate at last partially for the loss experienced due to the cable 102, this compensation may not be ideal.

Specifications related to vehicle to vehicle communication may require that the transmit power at an antenna be accurate within +−2 dB. In some systems, the accuracy of the gain in power amplifiers may be in the range of +−4 dB over temperature. The loss of the cable additionally adds inaccuracy due to changing length for different car models and physical effects on the cable such as temperature and bending etc. In some cases, there may be a variation of +−2 dB over a −40 C to 105 C temperature range. Thus an additional approach to compensation may be needed.

One such approach is to provide a closed loop control of the power of the transmit signal sent by the transceiver. In this approach, the power of a received transmit signal is measured and fedback to the transceiver over the cable. The transceiver may adjust the power of the transmit signal towards a transmit signal power required by the system. The signal separator 150 may further receive this measured power signal 153 and combine any signals to be sent over the cable 102.

It will be appreciated that while the signal separator 150 serves to separate signals received at the compensator circuit 100 over the cable, the signal separator 150 may further act as a combiner to combine signals to be sent from the compensator circuit 100 over the cable 102.

Thus in a remote antenna system, it may be desirable for the following signals to be sent between a controller side and a compensator circuit 100 side of the system: a data signal for transmission over the remote antenna 101 (transmit signal) or a data signal received from the remote antenna 101 (receive signal); a control signal from the transceiver to allow the compensator circuit 100 to switch between providing a receive path and a transmit path, for example to control the first 130 and second 140 switch; and a feedback power signal indicating a transmit power of the compensator circuit side.

In some embodiments the cable may be a single co-axial cable and may be configured to carry the above signals. In some cases, aiming to provide these signals on a single cable may cause issues of complexity with the circuitry of the compensator circuit 100.

Embodiments of the present application aim to provide a remote antenna system having a transmit power feedback in an efficient manner. In particular embodiments may aim to provide a bidirectional path over the cable between a controller side and a remote antenna side of a remote antenna system. The bidirectional control path may be configured to carry control information between a remote antenna control circuit and a remote antenna circuit. In one example the control signal may be a signal indicating a transmit/receive state of the system. In another example, the control signal may correspond to a feedback power signal. In other examples, the control signal may correspond to other control information, for example, local temperature at an amplifier in the compensation unit, for example for use in temperature compensation of the amplifier. The control signal may also correspond to antenna diagnosis information, for example if the compensator circuit is malfunctioning.

In embodiments the control path may be configured to carry control information between an antenna controller circuit and a remote antenna circuit. The control path may be bidirectional and be formed of a transmit circuit comprising an input to receive control information and configured to convert the control information into a series of pulses; and a receive circuit comprising: a comparator circuit configure to receive the series of pulses and reconstruct them to the control signal.

Figure 2:
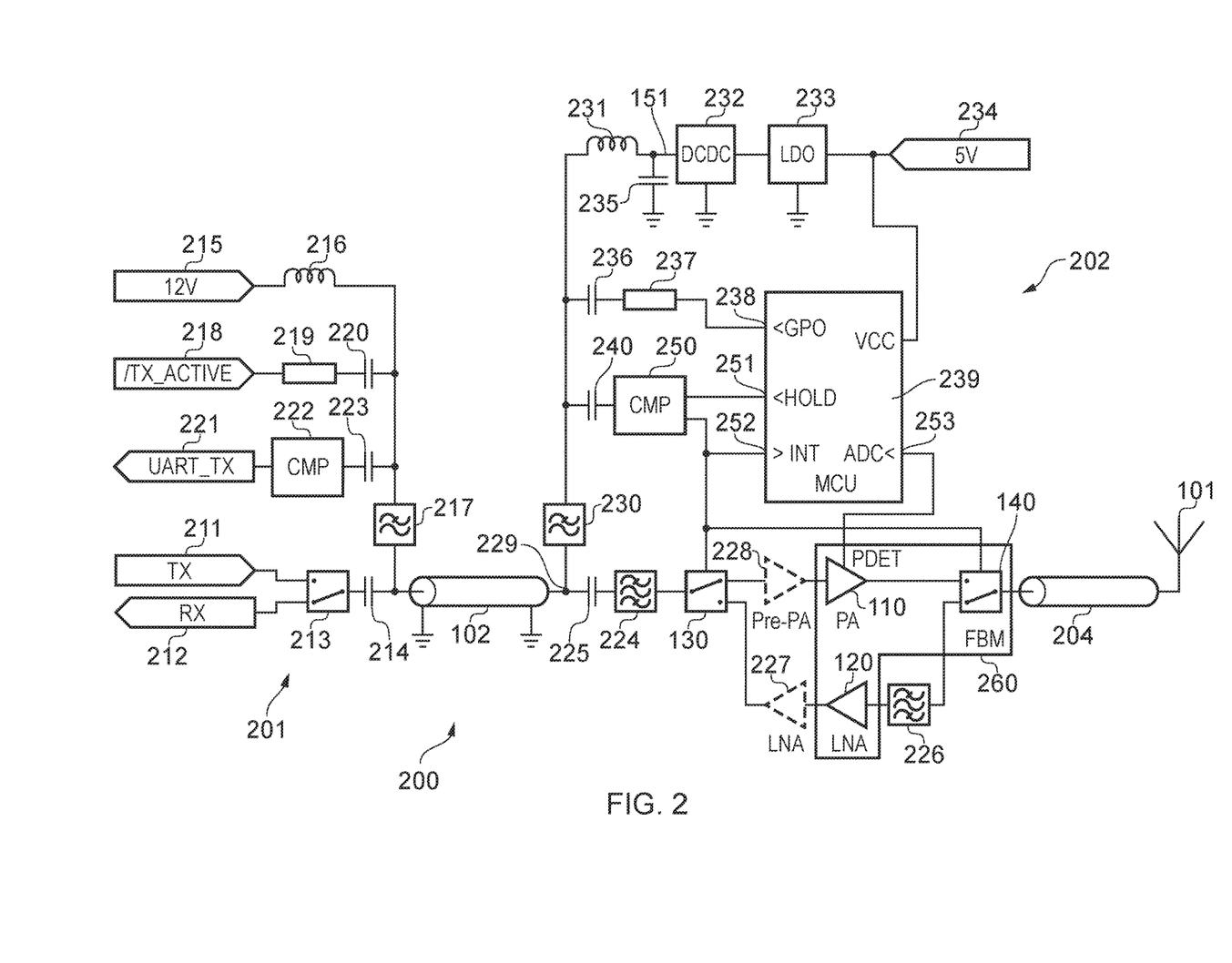
FIG. 2 is an example of a remote antenna system according to an embodiment.

FIG. 2 shows an example of an embodiment of the present application. FIG. 2 shows a remote antenna system 200 comprising a remote antenna controller 201 and a remote antenna circuit 202 coupled by a cable 102.

The remote antenna controller 201 comprises a transmit signal connection 211 configured to provide a signal to be transmitted using a remote antenna 203 to the cable 102 and a receive signal connection 212 configured to receive a signal from the remote antenna 203 over the cable 201. An output of the transmit signal connection 211 and an input of the receive signal connection 212 is coupled to a Tx/Rx switch 213 which is coupled to the cable 102 via a first capacitor 214. The remote antenna controller 201 further comprises a power source connection 215 configure to be coupled to a power source at the remote antenna controller 201. The power source connection 215 is coupled to the cable via an inductor 216 and a low pass filter 217.

The remote antenna controller 201 further comprises a transmit active signal connection (Tx_ACTIVE) 218 configured to indicate whether the controller 201 is providing a transmit signal to the remote antenna circuit 202. The Tx_Active input 218 may be coupled to the cable via a series coupled resistor 219 and second capacitor 220 and via the low pass filter 217. The remote antenna controller 201 further comprises a power measurement receive connection 221 configured to receive a measurement of the transmit power at the compensator circuit 202. The power measurement receive connection 221 is coupled to the cable 102 via a comparator circuit 222, third capacitor 223 and the low pass filter 217.

At the remote antenna circuit 202, a compensator circuit, remote antenna 101 and cable 204 coupling the compensator circuit to the remote antenna 203 are provided.

The compensator circuit comprises a first amplifier 110 and a second amplifier 120 coupled in parallel between a first switch 130 and a second switch 140. The first switch 130 may be bi-directionally coupled to the cable 102 via a first band pass filter 224 and a first capacitor 225. The first switch 130 may be coupled to an input of the first amplifier 110 and an output of the second amplifier 120. An output of the first amplifier 110 may be coupled to the second switch 140. The second switch 140 may be coupled to the input of the second amplifier 120 via a second band pass filter 226. The second switch 140 may be bi-directionally coupled to the remote antenna 101 via the cable 204. Optionally, a third amplifier 228 may be coupled between the first switch 130 and the first amplifier 110 and a fourth low-noise amplifier 227 may be coupled between the second amplifier 120 and the first switch 130. The third 228 and fourth 227 amplifiers may provide additional amplification and/or compensation for cable loss in some cases.

A remote antenna side connection 229 of the cable 102 may be coupled to a power supply path and control signal path via a first low pass filter 230. The power supply path may comprise an inductor 231 coupled between the first low pass filter 230 and a DC to DC converter 232 and an optional linear voltage regulator 233 providing a power supply connection 234. A second capacitor 235 may be coupled between a node between the DC to DC converter 232 and first inductor 231 and a reference voltage such as ground.

The control signal path may comprise a power transmit path comprising a third capacitor 236 coupled between the first low pass filter 230 and a first terminal of a resistor 237. A second terminal of the resistor 237 may further be coupled to a power measurement output pin 238 of a controller 239 which may be a microcontroller. The control signal path may further comprise a transmit state path comprising a fourth capacitor 240 coupled between the low pass filter 230 and a comparator circuit 250. A first output of the comparator circuit is coupled to a hold output pin 251 of the controller 239. A second output of the comparator circuit 250 is coupled to an interrupt (INT) pin 252 of the controller 239. The second output of the comparator circuit 250 is further coupled to a control input of the second switch 140 and a control input of the first switch 130.

A power measurement output of the first amplifier 110 may be coupled to an analogue to digital converter pin 253 of the controller.

In the example of FIG. 2, the output pin 238 has been described as outputting a power measurement. It will however be appreciated that the pin 238 may be configured to output other control information generated by the microcontroller. For example the microcontroller may carry out a temperature measurement of one or more amplifiers in the compensator circuit and sent this information to the remote antenna controller 201 in order to compensate for the effects of temperature on the compensator circuit. In other examples, the pin 238 may be configured to output other control information such as diagnosis information relating to the behaviour of the remote antenna.

It will be appreciated that while, on the remote antenna controller 201, first 214, second 220 and third 223 capacitors and first resistor 219 have been described, these may be replaced with other circuitry having similar or equivalent functionality. The capacitor 214 may be implemented as a DC block capacitor to prevent leakage of the DC voltage to the transmit/receive signal path path. The capacitors 223 and 220 may be DC block capacitors for coupling the input and output of the signals on the cable. Similarly, the first 225, second 231, third 236 and fourth 240 capacitors and resistor 237 on the remote antenna circuit may be replaced with any suitable circuitry.

In this example, the respective inductors 216 and 231 may form a bias tee topology with the respective capacitors 214 and 225, however it will be appreciated that other implementation are possible. It will also be appreciated that the filters 217, 230, 226 and 224 may be implemented by any suitable filter circuitry.

The cable loss compensation circuit 100 of FIG. 1 was described comprising a signal separator 150 that may separate signals on the cable into a transmit/receive signal, a power signal 151, a control (or transmit state) signal 150 and a transmit power measurement signal 153. Similarly, the remote antenna system 200 of FIG. 2 comprises a transmit/receive signal path, a power signal path and a bidirectional control signal path that can carry a transmit state signal and a power measurement signal. The operation of FIG. 2 will now be described in relation to these paths.

The transmit/receive signal path of FIG. 2 comprises the transmit signal connection 211, the receive signal connection 212, the Tx/Rx switch 213, first remote antenna controller capacitor 214, cable 102, first remote antenna circuit capacitor 225, band pass filter 224 and the compensator circuit comprising first and second switches 130, 140 and first and second amplifiers 110, 120, the cable 204 and remote antenna 101.

The transmit signal connection 211 is configured to receive a signal to be transmitted using the remote antenna 101 from further circuitry (not shown). The receive signal connection 212 is configured to receive signal received at the remote antenna 101 via the cable 102. The Tx/Rx switch 213 receives an indication of whether the remote antenna is to transmit or receive. If the remote antenna is to transmit, the Tx/Rx switch 213 connects the transmit signal connection to the cable 102. A transmit signal traverses the cable and passes through capacitor 225 and bandpass filter 224 to be provided at the input of switch 130. The switches 130 and 140 receive an indication that the remote antenna is to transmit and the first switch 130 couples its input to the first power amplifier. Second switch 140 coupled the remote antenna connection to the output of the first amplifier 110. Thus a transmit path from the transmit signal connection 211 to the remote antenna 101 is formed.

If the remote antenna is to receive, the second switch 140 couples the remote antenna output to the input of the second amplifier and the first switch 130 couples the output of the second amplifier 120 to the band pass filter 224. The Tx/Rx switch 213 couples the cable 102 connection to the receive signal connection. Thus a signal received at the remote antenna 101 may traverse the second switch 140, second amplifier 120, first switch 130, band pass filter 224, capacitor 225, cable 102, capacitor 214, Tx/Rx switch 213 to the receive signal connection 212. The receive signal connection 212 may provide the signal to further circuitry (not shown) for signal processing.

The receive or transmit signal may operate in an RF frequency range, for example in the 2.4 GHz or 5.4-5.9 GHz range (however it will be appreciated that other ranges may be used). The first amplifier 110 and optional pre-power amplifier 228 may be provided in the transmit path to compensate for cable loss and to generate a strong transmit signal. In the receive path, the second amplifier 120 and optional fourth amplifier 227 may be low noise amplifiers (LNAs) configured to improve the noise figure and sensitivity of the received signal and compensate for the cable losses. The cable 102 in some examples, may be a high loss cable with, for example, a 10 dB insertion loss.

A power signal or DC power supply path may be provided by the power source connection 215, inductor 216, low pass filter 217, cable 102, low pass filter 230, inductor 231, second remote antenna circuit capacitor 235, DC to DC converter 232 and optional LDO 233 which may provide the remote antenna circuit power supply 234. A bias tee topology comprising the inductor 216, capacitor 214 and low pass filter 217 on the remote antenna controller 201 and a bias tee topology comprising the inductor 231, capacitor 225 and the low pass filter 230 on the remote antenna circuit 202 may create a DC power path over the cable 102. In some examples, this DC power supply path may have a high resistance, in some examples 2 Ohms. A high supply voltage of, in this example, 12V may be used over this path. It will however be appreciated that the value of the remote antenna circuit supply and remote antenna controller circuit supply may be selected to be application specific and is not limited to these values.

In operation, the DC power supply path may provide DC power over the cable 102 to the DC to DC converter 232. The converter 232 may create an intermediate voltage (in this example of 6V). The optional LDO 233 may generate a supply voltage (in this example 5V) for all active components within the compensator circuit.

The bidirectional control path comprises a power measurement path to provide information from the compensator circuit or remote antenna circuit 202 to the remote antenna controller 201 and a control or transmit state path to provide information from the remote antenna controller 201 to the remote antenna circuit 202.

The transmit state path comprises the Tx_ACTIVE connection 218, the resistor 219, capacitor 220 and the low pass filter 217 on the remote antenna controller 201. The transmit state path comprises the low pass filter 230, capacitor 240 and comparator circuit 250 on the remote antenna circuit 202. The comparator circuit 250 is coupled to a hold pin of the microcontroller and provides a control signal to the first and second switches 130 and 140 of the compensator circuit. The comparator circuit 250 is further coupled to the interrupt pin 252 of the microcontroller. The comparator circuit 250 is configured to assert the interrupt pin 252 when the transmit state of the system changes from receive to transmit. An interrupt may be raised in response to the interrupt pin 252 being asserted which may trigger the microcontroller to carry out a power or temperature measurement on the compensator circuit.

The power measurement path comprises a power measurement signal from the first amplifier 110 which then passes through an analogue to digital conversion pin 253 of the microcontroller 239. An indication of the measured power is provided at output pin 238 of the microcontroller 239 which is coupled to resistor 237 and capacitor 236. The indication of measured power passes through the low pass filter 230, traverses the cable 102, passes through the low pass filter 217 and is provided to the power measurement receive connection 221 via the capacitor 223 and comparator circuit 222.

In the example of FIG. 2, a controller 239 is provided. The controller 239 may provide functionality for the remote antenna circuit relating to the timing of the sending of the power measurement signal and may provide an analogue to digital conversion for an analogue measurement at the first amplifier 110. The first amplifier 110 may comprise an embedded power detector that may provide a measurement of the power of the amplifier signal.

In example, the measurement of the power is configured to occur a set time after a transmit signal has been received by the compensator circuit from the remote antenna controller 201. This set period may ensure that the measurement takes place during a preamble phase of an OFDM signal to be transmitted as the preamble may have a fixed and known power level. In one example, the set period may correspond to 6 us, however it will be appreciated that this is system specific. In an example the measurement of the power may be triggered by an interrupt being raised by the interrupt pin 252. The comparator circuit 250 may assert a signal on this pin when the transmit state changes from a receive state to a transmit state.

It will be appreciated that the measurement of the power is given by example only. In other example an internal temperature sensor of the microcontroller 239 may measure a temperate of the compensator circuit. Therefore in embodiments, it is sufficient that a power measurement is made through any means and the power measurement transmit path is used to signal such measurement to the remote antenna controller 201.

The operation of the bidirectional control will be described further in relation to FIGS. 3 and 4.

Figure 3:
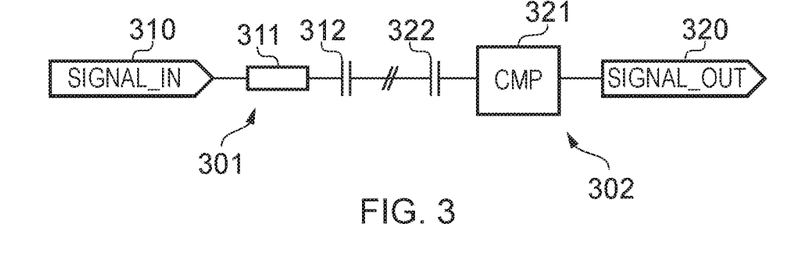
FIG. 3 is an example of control path between a control and remote antenna circuit of a remote antenna system.

FIG. 3 shows and example of one of the Tx_ACTIVE signaling path and the power measurement signaling path. It will be appreciated that both paths comprise similar circuitry in opposite transmission directions.

FIG. 3 shows a transmit circuit 301 and a receive circuit 302 of one direction of the bidirectional control path. The transmit circuit comprises a signal in connection 310 coupled to a first terminal of a resistor 311. A second terminal of the resistor 311 is coupled to a cable, for example cable 102, via a first capacitor 312. The transmit circuit circuitry may correspond to the TX_active connection 218, resistor 219 and capacitor 220 of the controller circuit 201 or to the measured power output pin 238, resistor 237 and capacitor 236 of the remote antenna circuit 202.

The receive circuit 302 comprises second capacitor 322 comprising a first terminal coupled to a cable, for example cable 102. A second terminal of the capacitor 322 is coupled to an input of a comparator circuit 321. An output of the comparator circuit 321 is coupled to an output signal connection 320. The second capacitor 322, comparator circuit 321 and output signal connection may correspond to the capacitor 223, comparator circuit 222 and power measurement receive connection 221 of the remote antenna controller 201 or to the capacitor 240, comparator circuit 250 and the output provided from the comparator circuit 250 to the first and second switches 130 and 140 of the remote antenna circuit 202.

In embodiments of the present application, the control signals, for example the power measurement signal and the transmit state signal are transmitted as a pulse or series of pulses over the cable 102.

Figure 4:
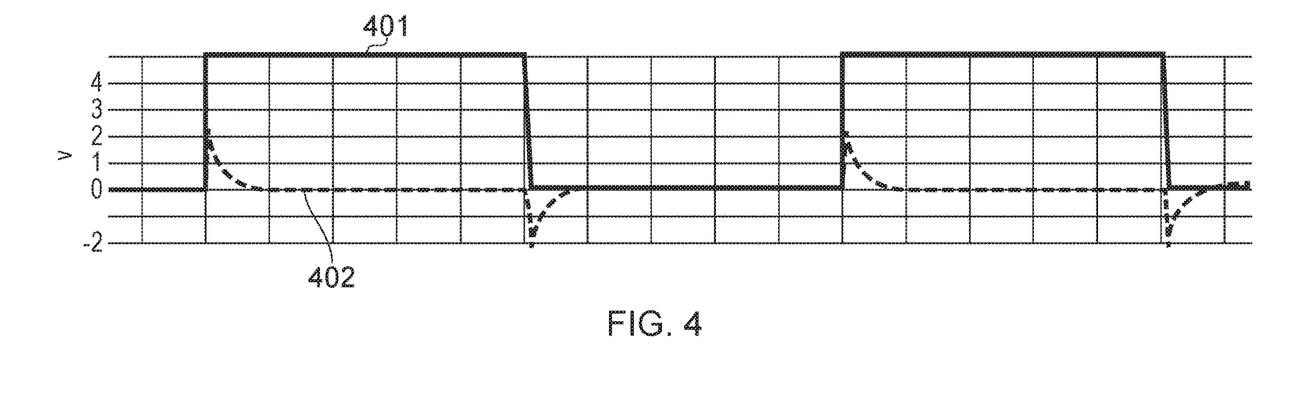
FIG. 4 is a signal diagram depicting signals carried over a cable.

FIG. 4 is a signaling diagram showing an example of a signal transmitted by the transmit circuit 301, over a cable and received by the receive circuit 302. SIGNAL_IN 401 is a digital signal received at the input signal connection 310 to be transported over the coax cable. The signal received at the output signal connection 320 is a signal reconstructed by the comparator circuit 321 from the signal that is received over the cable and should ideally be exactly equal to SIGNAL_IN.

FIG. 4 shows an indication of the signal SIGNAL_IN 401 provided to the cable for transmission and a signal 402 imperfectly corresponding to SIGNAL_IN received at the input to the comparator circuit 321. SIGNAL_IN comprises a square wave that indicates a transmit state of the remote antenna system. The level of the signal SIGNAL_IN may indicate the transmit state. In one example, when SIGNAL_IN is high, the system may be in a receive state and when SIGNAL_IN is low the system may be in a transmit state. It will be appreciated that this is by way of example only and the levels of SIGNAL_IN may correspond to different states. In times when the remote antenna is idle, SIGNAL_IN may not be asserted.

For each transition of SIGNAL_IN, a pulse appears on the cable. For example a high to low transition provides a negative pulse and a low to high transition provides a positive pulse on the cable. It can be seen that the signal at the input to the comparator.

Referring back to FIG. 3, the mechanism for converting the square wave SIGNAL IN 310 to a pulse will be described. As described, the transmit circuit 301 comprises a resistor 311 and capacitor 312 coupled in series between the input signal connection 310 and cable circuitry. It will be appreciated that the capacitor 312 may not be coupled directly to the cable 102 but may be coupled through coupling circuitry such as a low pass filter, for example filters 217 or 230. I will be appreciated that the transmit circuit 301 may see a load impedance at the cable side connection of the capacitor 312. The load impedance may be represented as a resistance between the cable side terminal of the capacitor 312 and a reference voltage such as ground. In this case, the resistor 311, capacitor 312 and load impedance (not shown) may form a high pass filter that may convert a transition on the square wave of SIGNAL_IN to a pulse.

The shape of the pulse may be determined by the values of the resistor 311, capacitance 312 and resistor representing the load impedance (not shown). The resistor 311, capacitor 312 and resistor representing the load impedance may determine the cut-off frequency of the resulting high pass filter and hence shape the pulse.

The values of the resistor 311 and capacitor 312 may be set so that the pulse settles to 0V quick enough to allow fast control signaling across the cable. This is particularly importance if UART frames are signaled on the bidirectional control path. The resistor 311 and capacitor 312 additionally may be set to define a minimum pulse length. In some examples, the value of the resistor 311 may further help to attenuate noise that may be present on the pulse before the pulse is output to the cable circuitry.

The comparator circuit 321 receives the series of pulses 402 and reconstructs them to a square wave to be provided as a control signal (for example corresponding to the measured power or the transmit state). An example of a comparator circuit 321 and its operation is described in relation to FIG. 5.

Figure 5:
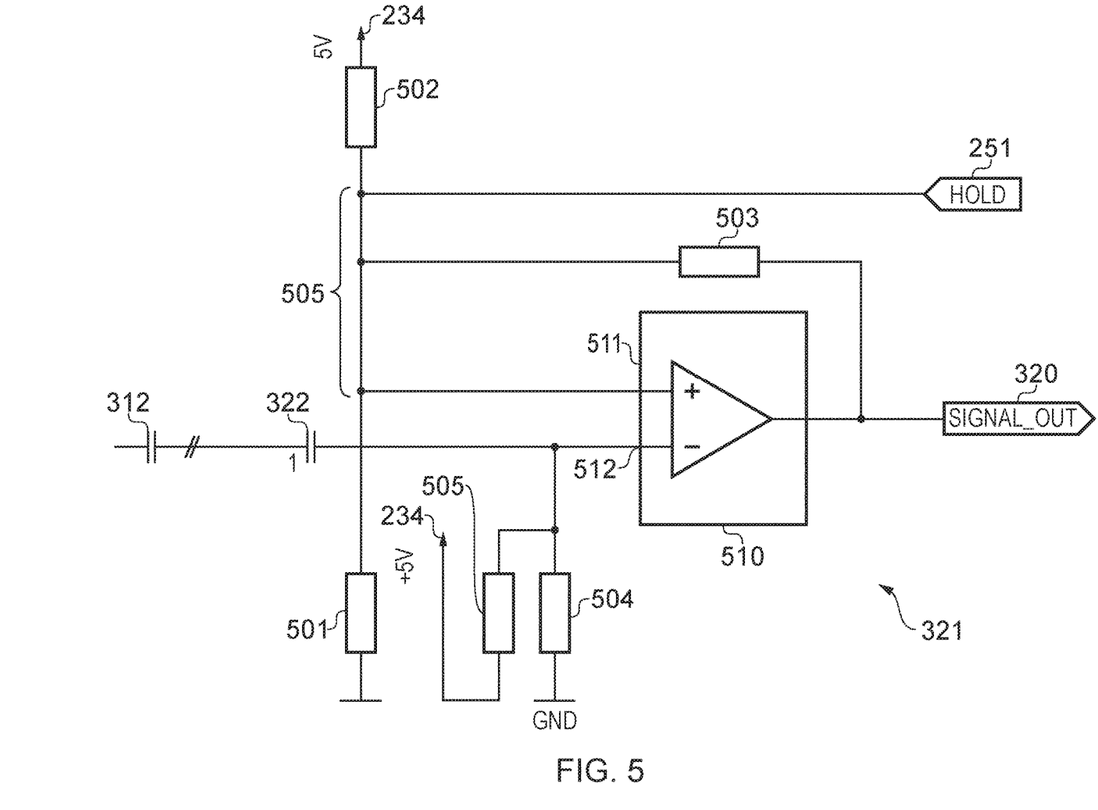
FIG. 5 is an example of a comparator circuit.

FIG. 5 shows an example of a comparator circuit 321 coupled to a second terminal of capacitor 322. The first terminal of capacitor 322 is coupled to other circuitry and cable 102 to an output terminal of capacitor 219.

The comparator circuit 321 comprises an amplifier 510 having a first input 511 and second input 512. In this example, the first input is a non-inverting input and the second input is an inverting input. The output 513 of the amplifier 510 is coupled to provide a reconstructed output signal at the output signal connection 320. The second input 512 of the amplifier 510 is coupled to the second terminal of capacitor 322 and is configured to receive a signal transmitted over the cable, for example, the signal 402.

The comparator circuit 321 further comprises a first resistor 501 and a second resistor 502 coupled in series between the power supply 234 and ground. A node 505 between the first 501 and second 502 resistors is coupled to the first input 511 of the amplifier 510. The node 505 is further coupled to the output signal connection 320 via a third resistor 503.

When the comparator circuit 321 is at the remote antenna circuit 202, the node 505 is further coupled to a hold pin 251 of the microcontroller 239. It will be appreciated that when the comparator circuit 321 is at the remote antenna controller 201, this connection may be absent.

The comparator 321 further comprises a fourth resistor 504 coupled between the second input 512 and ground and a fifth resistor 505 coupled between the second input 512 and the supply voltage 234. In some implementations, the resistors 501 to 505 may be of equal resistance.

The comparator circuit reconstructs pulses 402 received from the cable to a signal corresponding to the SIGNAL_IN 401. In this example, the comparator circuit operates with hysteresis to reconstruct the signal.

In operation, a signal received over the cable is decoupled from any dc voltage on the cable by capacitor 322. The incoming signal is then DC biased by the fourth and fifth resistors 504 and 505. In this example, the resistors 504 and 505 are equal in value and so the signal is DC biased at half the supply voltage. It will however be appreciated that other DC biasing may be used. The biased signal 402 is input to the second inverting input of a comparator 510. It will be appreciated that in this example, the amplifier 510 acts as a comparator.

The first non-inverting input 511 of the comparator 510 is coupled to a reference voltage at node 505. The reference voltage is provided by a voltage divider provided by the first and second resistors 501 and 502. A feedback from the output of the comparator 510 via a third resistor 503 is also coupled to node 505. This may create a hysteresis, such that the reference level is set to either a third or two thirds of the supply voltage (assuming the resistors have equal value). The effect of this hysteresis creates a "holding" effect, in other words, when a positive pulse is received at the comparator output signal 320 is held LOW and when a negative pulse is received, the comparator output signal 320 is held HIGH.

In this manner, pulses received over the cable are reconstructed to a square wave that may be either used to control the switches 130 and 140 according to whether the system is in a transmit or receive mode or may be decoded to determine a measured power corresponding to a power at which the remote antenna is transmitting.

As discussed, when the comparator 510 is at the remote antenna circuit 202, the node 505 is further coupled to a hold pin 251 of the microcontroller 239. The hold pin 251 may provide a hold signal to the comparator circuit 321 generated by the microcontroller 239. The signal may be generated in response to a determination that a power measurement is to be sent. The hold signal can force a high or a low state at the output of the comparator circuit 320. In the case that the hold signal is present, the comparator 321 will be the remote antenna circuit's comparator circuit 250 and the output 320 of the comparator circuit 250 will be used to set compensation circuit to a transmit or receive state. In particular the output will be coupled to the first and second switches 130 and 140 to select a transmit path comprising the first amplifier 110 or a receive path comprising the second amplifier 120.

In this example, the Hold signal may have 3 states. In a first state, the controller 239 may set the hold signal to TRISTATE. In this case, the hold pin has no effect on SIGNAL_OUT 320. In a second state, the controller 239 may set the hold signal to high. This may cause SIGNAL_OUT 320 to have a continuous high state. In a third example, the controller 239 may set the hold signal to low. This may lead to SIGNAL_OUT 320 having a continuous low state.

In this example, when the output of the comparator circuit 250 is low, the switches 130 and 140 are controlled to select a receive path of the compensation circuit 260 and when the output of the comparator circuit is high, the transmit path of the compensation circuit 260 is selected. When the hold signal is in tristate, the output of the comparator circuit will follow the received and reconstructed transmit state signal.

Figure 6:
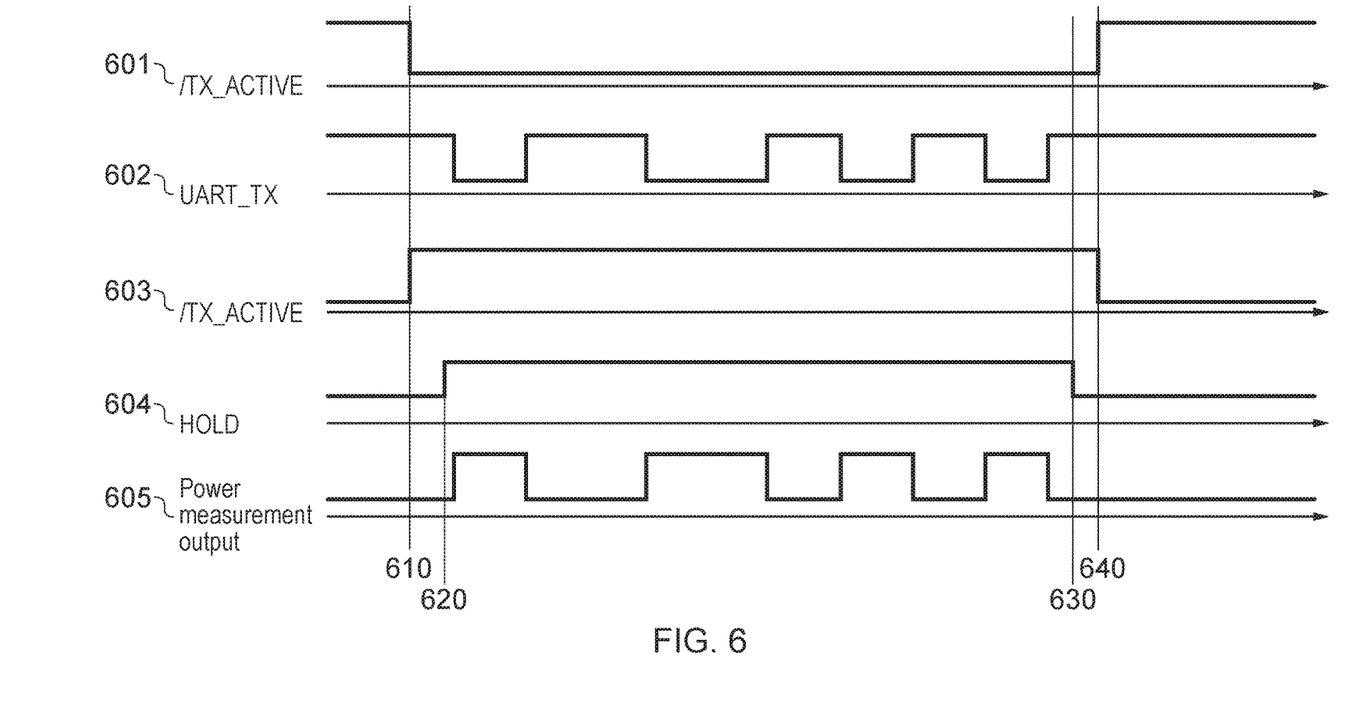
FIG. 6 is a signalling diagram showing example signalling in a remote antenna system.

The hold signal may be used to send a power measurement signal to the remote antenna controller 201 over the bidirectional path without the power measurement signal being fed to the input of the comparator. FIG. 6 shows an example of such signaling.

FIG. 6 shows signaling diagram for the transmit state signal 601 sent from the remote antenna controller 201 and the power measurement signal 602 received at the remote antenna controller 201. FIG. 6 further shows a transmit state signal 603 generated by the comparator circuit 250 the remote antenna circuit 202 and a hold signal 604 received from pin 251 of the controller 239. FIG. 6 further shows a power measurement output signal 605 provided at pin 238 of the controller 239.

In this example, the transmit state signal 601 at the remote antenna controller 201 is transmitted as an inverse of the transmit state. However, it will be appreciated that this is by way of example only and signals may be inverted or non-inverted according to circuitry.

At time 610, the inverse transmit state signal 601 generated by the remote antenna controller 201 goes low to indicate that a transmit state is being entered. At this point, the transmit signal connection 211 may start receiving a signal to transmit and provide it over the transmit/receive path to the remote antenna circuit 202. The comparator circuit 250 may receive and reconstruct the inverse transmit state signal 601 and may output a high transmit state signal 603 to the first and second switches 130 and 140. In response, the switches may switch the compensation circuitry to a transmit path. The comparator circuit 250 may further assert an interrupt on the interrupt pin 252 to indicate to the controller 239 that the transmit state is now transmit. In this example the controller 239 may make a measurement of the transmit power, however it will be appreciated that the controller 239 may make other measurements or determinations of control information in other examples.

At time 610, the hold signal may be in tristate and thus the transmit state output signal 603 may follow the transmit state signal 601.

It will be appreciated that while the transmit state signal 601 is shown as a square wave, this is at the transmit state connection 218. The corresponding signal transmitted across the cable will be a pulsed signal, for example in accordance with the description of FIG. 4.

The transmit signal from the transmit signal input connection 211 may initially comprise a preamble if the signal transmitted is an OFDM signal. At a time 620, the controller 239 may assert the hold signal 604 at hold pin 251. The hold signal 604 may force the transmit state signal 603 at the output of the comparator circuit to stay high. Then the hold signal 604 is asserted, the transmit state output signal 603 will not follow a signal received over the cable. At time 620, the microcontroller 239 may perform a measurement of the transmit power of the remote antenna.

Time 620 may be a set period after time 610. The set period may be short enough to ensure that the measurement is made during a preamble phase of the transmitted signal but may be long enough to allow the first amplifier 110 to settle.

The microcontroller 239 may output the power measurement 605 at pin 238 which is output on the cable from the remote antenna circuit 202 to the remote antenna controller 601. The signal output on the bidirectional control path via cable 102 may correspond to the output power measurement 605 however because the hold signal 604 is holding the transmit state output signal 603 high, the transmit state output signal 603 will not follow the output power measurement signal 605.

It will be appreciated that while the output power measurement signal 605 is shown as a square wave at the output of pin 238. However, the corresponding signal transmitted across the cable will be a pulsed signal, for example in accordance with the description of FIG. 4.

At time 630, the power measurement is made and the microcontroller asserts the hold signal 604 back to tristate. The transmit state output signal 603 is now free to follow the transmit state signal 601 and does so at time 640.

In the foregoing, control information sent from the remote antenna circuit 202 to the remote antenna controller 201, for example a measured power signal, has been exemplified as being transmitted as a UART frame. It will be appreciated that this is by way of example only and in other examples, the control information may be transmitted as any square wave. In a further example, the control information may be transmitted as timing pulses.

When using UART messages, the microcontroller 239 in the compensator circuit might need a ceramic or crystal resonator to set an accuracy of the timing pulses sent to the remote antenna controller 201. In one example, the microcontroller 239 may send two pulses to the remote antenna controller. The first pulse may comprise a fixed pulse duration relative to an oscillator clock at the microcontroller 239. The remote antenna controller may use the length of the first pulse to normalize the length of the second pulse being sent. Therefore any further pulses set according to a potentially inaccurate microcontroller 239 clock may be correctly interpreted by the remote antenna controller 201.

In some embodiments the transceiver may be an electronic control unit (ECU) and may for example be implemented in a vehicle as part of a V2X system, however it will be appreciated that the transceiver is not limited as such.

In the foregoing examples have been given in the context of vehicle to vehicle communication, it will however be appreciated that embodiments may be implemented in other systems that implement remote antennas. For example embodiments may be implemented in systems in accordance with other communication standards such as, as non-limiting examples, Wifi, Bluetooth and/or Bluetooth low energy. In the foregoing, the control signal on the bidirectional control path has been exemplified as being an indication of a transmit state or a power measurement signal. It will however be appreciated that the bidirectional control path may be used for any relevant control information. For example, the control information may correspond to a local temperature at an amplifier in the compensation unit, for example for use in temperature compensation of the amplifier. In another example, the control signal may correspond to antenna diagnosis information for the remote antenna, for example if the compensator circuit is malfunctioning.

It will be appreciated that various modifications or extensions may be made to the foregoing embodiments.

In one further example, the bidirectional control path may be used to carry control information to bypass the second amplifier 120 or optional amplifier 227. In this example, the remote antenna controller 201 may indicate that the microcontroller 239 bypass the amplifier 120 by sending short pulses of for example, 1-2 us duration.

The microcontroller 239 may turn off a bypass switch in response to the signal. In this example, two pulse length may be defined—for example a 1 us pulse length may indicate that the amplifier 120 is to be bypasses and a 2 us pulse length may indicate that the amplifier 120 is to be no longer bypassed. It will be appreciated that two short pulses are by way of example only and other patterns may be used.

In the foregoing, the control information has been described as a measured power signal or measured tempered signal that may be measured by a power detector or temperature sensor, for example placed at the first or transmit amplifier 110. Some implementations of the power detector may have a linear characteristic to the dBm value. This may mean that the power detector has a lower accuracy at low transmit power levels and higher accuracy at higher transmit power levels. In order to address this difference in accuracy in some embodiments, the remote antenna controller 201 may set a power of the transmit signal according to an offset calculated from a power measurement at a higher transmit power level.

For example, when the transmit power level is high, for example 15 dBm, the remote antenna controller 201 may receive a measured power value from the remote antenna circuit 202. The remote antenna controller 201 may determine a power offset by subtracting a value of set power and the received measured power. The set power may be the power at which the remote antenna controller 201 sends a transmit data signal to the remote antenna across the cable. When the transmit power level is low, for example −5 dBm, instead of receiving a measured power value and calculating a new offset, the remote antenna controller 201 may receive a measured temperature signal and use an offset that was previously calculated from a transmission at a higher power for that temperature. Due to the inaccuracy of the power detector at low power, this previously calculated offset may be more accurate than a new offset calculated from a measured power value detected at a low transmit power.

In some examples, this may be enabled by control information being signalled from the remote antenna circuit 202 to the remote antenna controller 201 having two values—a measured power value and/or temperature value and a transmitter signal strength (TSSI) value. The remote antenna controller 201 can determine based on the TSSI, whether or not the measured power value is accurate and whether to calculate a new offset or use an old one corresponding to the same temperature.

In the foregoing, it has been described that a measurement of power or temperature may be made in response to a change in transmit state and be converted from an analog to digital value before being transmitted as control information. In some cases, and analogue to digital conversion within a microcontroller may take several microseconds to finish. In case for a selected microcontroller the time is too long to send the feedback back within the minimal OFDM burst length, the microcontroller 239 may send back a previously converted power detector result and execute a new analogue to digital conversion in parallel. The new or latest measurement may be transported back to the remote antenna controller in the next transmission burst.

In the foregoing, the control information has been exemplified as being a measured transmit power of the power amplifier 110. By getting a feedback of the transmit power, it is possible to calculate the offset between requested and transmitted power. In some further examples this offset can be used to get an estimation of the power loss in the receive signal path.

It will further be appreciated that embodiments may be concerned with the detection of the pulses sent on the control path. In some cases, variations in DC current may have an effect on the pulse detection circuit, for example, comparator 321. In this case the LC filter comprising inductor 231 and capacitor 235 may be implemented with a low cutoff frequency. This effect may further be reduced by implementing a low DC resistance on the path and high supply voltage 215, with a buck converter at the remote antenna circuit.

The invention claimed is:

1. A remote antenna system comprising:
   an antenna controller circuit; and
   a remote antenna circuit coupled to the antenna controller circuit by a cable; the remote antenna system comprising:
   a bidirectional data signal path for carrying transmit and received data signals between the antenna controller circuit and the remote antenna circuit; and
   a control path for carrying control information between the antenna controller circuit and the remote antenna circuit; wherein the control path is a bidirectional control path comprising:
   a transmit circuit comprising an input to receive control information and configured to convert the control information into a series of pulses; and
   a receive circuit comprising:
   a comparator circuit configure to receive the series of pulses and reconstruct them to the control signal.

2. The remote antenna system of claim 1, wherein the transmit circuit comprises a high pass filter configured to receive a control information signal and convert a transition of the control information signal to a pulse.

3. The remote antenna system of claim 2, wherein the control information signal comprises a square wave and a transition of the control information signal comprises one of a high to low transition and a low to high transition.

4. The remote antenna system of claim 2, wherein the high pass filter comprises a resistor and capacitor coupled in series between a control information signal input and cable circuitry.

5. The remote antenna system of claim 1, wherein the control path is configured to operate in a first direction from the remote antenna controller circuit to the remote antenna circuit and the control information carried in the first direction comprises a transmit state signal indicating whether the remote antenna is to transmit the data signal or receive the data signal.

6. The remote antenna system of claim 5, wherein the comparator circuit is configured to receive a series of pulses from the remote antenna controller and reconstruct the series of pulses to a transmit state signal.

7. The remote antenna system of claim 6, further comprising a microcontroller configured to measure a power at the first amplifier and generate a measured power signal to be carried by the control path in the first direction.

8. The remote antenna system of claim 7, wherein the microcontroller is further configured to generate a hold signal to be coupled to the comparator, the hold signal overrides the output of the comparator circuit such that it corresponds to the hold signal.

9. The remote antenna system of claim 8, wherein the microcontroller is configured to generate the hold signal to set the comparator circuit output to a transmit state of the antenna being transmitting in response to generating a measured power signal.

10. The remote antenna system of claim 1, wherein the control path is configured to operate in a second direction from the remote antenna circuit to the remote antenna controller circuit and the control information carried in the second direction comprises a measured power signal corresponding to a transmit power of the remote antenna.

11. The remote antenna system of claim 1, wherein the comparator circuit comprises an output for outputting the reconstructed signal.

12. The remote antenna system of claim 1, wherein the remote antenna circuitry further comprises a compensation circuit configured to amplify the data signal to compensate for cable loss of the cable.

13. The remote antenna system of claim 12, wherein the compensation circuit comprises a first amplifier to amplify a transmit data signal and a second amplifier to amplify a receive data signal and first and second switches to switch between the first and second amplifiers in response to the transmit state signal.

14. A remote antenna circuit configured to be coupled to an antenna controller by a cable; the remote antenna circuit comprising:
   a bidirectional data signal path for carrying transmit and received data signals between the antenna controller circuit and the remote antenna circuit; and
   a control path for carrying control information between the antenna controller circuit and the remote antenna circuit; wherein the control path is a bidirectional control path comprising:
   a transmit circuit comprising an input to receive control information and configured to convert the control information into a series of pulses; and
   a receive circuit comprising:
   a comparator circuit configure to receive the series of pulses and reconstruct them to the control signal.

15. A remote antenna controller configured to be coupled to a remote antenna circuit by a cable; the remote antenna controller comprising:
   a bidirectional data signal path for carrying transmit and received data signals between the antenna controller and the remote antenna circuit; and
   a control path for carrying control information between the remote antenna controller and the remote antenna circuit; wherein the control path is a bidirectional control path comprising:
   a transmit circuit comprising an input to receive control information and configured to convert the control information into a series of pulses; and
   a receive circuit comprising:
   a comparator circuit configure to receive the series of pulses and reconstruct them to the control signal.

* * * * *